Feb. 27, 1934. W. FERRIS Re. 19,095

HYDRAULIC TRANSMISSION

Original Filed April 11, 1921 6 Sheets-Sheet 1

Inventor:
Walter Ferris.
By Parks & Carter
his Attorneys:

Witness:
F. J. Gathmann

Feb. 27, 1934. W. FERRIS Re. 19,095

HYDRAULIC TRANSMISSION

Original Filed April 11, 1921 6 Sheets-Sheet 2

Inventor:
Walter Ferris.

Witness:
F. J. Gathmann

By Parks & Carter
his Attorney

Feb. 27, 1934. W. FERRIS Re. 19,095

HYDRAULIC TRANSMISSION

Original Filed April 11, 1921 6 Sheets-Sheet 3

Witness:
F. J. Gathmann

Inventor:
Walter Ferris.
By Parks & Carter
his Attorneys.

Feb. 27, 1934. W. FERRIS Re. 19,095

HYDRAULIC TRANSMISSION

Original Filed April 11, 1921 6 Sheets-Sheet 4

Witness:
P. J. Gathmann

Inventor:
Walter Ferris.
By Parker & Carter
his Attorneys.

Feb. 27, 1934. W. FERRIS Re. 19,095

HYDRAULIC TRANSMISSION

Original Filed April 11, 1921 6 Sheets-Sheet 5

Witness:
F. Gathmann

Inventor
Walter Ferris.
By Parker & Carter
his Attorneys:

Feb. 27, 1934. W. FERRIS Re. 19,095

HYDRAULIC TRANSMISSION

Original Filed April 11, 1921 6 Sheets-Sheet 6

Witness:
P. J. Gathmann

Inventor:
Walter Ferris.
By Parker & Carter
his Attorneys.

Reissued Feb. 27, 1934

Re. 19,095

UNITED STATES PATENT OFFICE 19,095

HYDRAULIC TRANSMISSION

Walter Ferris, Milwaukee, Wis., assignor to Oilgear Company, Milwaukee, Wis., a corporation of Wisconsin Original No. 1,619,200, dated March 1, 1927, Serial No. 460,184, April 11, 1921. Application for reissue September 11, 1933. Serial No. 689,046

27 Claims. (Cl. 60—52)

This invention relates to variable speed hydraulic transmissions of the type employed for operating the carriage of a machine tool at either rapid traverse speeds or at selective feeding speeds.

The transmission to which the invention applies in particular is provided with a motor for operating the carriage, a feed pump for supplying liquid to the motor to drive the same at predetermined feeding speeds, an auxiliary pump for supplying liquid to the motor to drive the same at rapid traverse speed, and valve means for controlling the motor.

The present invention has as an object to provide a hydraulic transmission in which an auxiliary pump supplies liquid to the feed pump to keep the same flooded.

Another object is to provide a hydraulic transmission in which the entire volume of liquid discharged from the motor during feeding operations is delivered direct to the feed pump.

Another object is to provide a hydraulic transmission in which the entire volume of liquid discharged from the motor during feeding operations is delivered direct to the feed pump and any deficiency in this volume of liquid is made up by liquid supplied by an auxiliary pump.

Another object is to provide a hydraulic transmission with an auxiliary pump and with valve means for directing liquid from the auxiliary pump into either side of the hydraulic circuit to either increase the flow therein or to supercharge the feed pump.

Another object is to provide a hydraulic transmission in which a variable displacement pump and an auxiliary pump are arranged within the same casing.

Another object is to provide a hydraulic transmission in which a unitary control is employed to regulate the displacement of the pump and to control the operation of the motor.

Another object is to provide a hydraulic transmission which is susceptible of close adjustment and control.

Another object is to provide a hydraulic transmission which is positive and precise in operation.

Other objects and advantages will be apparent from the description hereinafter given of an illustrative embodiment of the invention.

According to the invention in its general aspect and as ordinarily embodied in practice, the transmission is provided with a hydraulic motor for connection to the mechanism or machine to be driven, a variable displacement pump for delivering liquid to the motor to drive the same at predetermined speeds, fluid channels connecting the pump and the motor and forming therewith a hydraulic circuit, and an auxiliary pump for supplying liquid to the variable displacement pump to keep it flooded.

According to the invention in another aspect, the variable displacement pump and the motor are connected to each other by substantially closed fluid channels during feeding operations whereby the entire volume of liquid discharged from the motor is delivered direct to the intake of the variable displacement pump.

According to the invention in another aspect, the transmission is provided with a pump unit consisting of a variable displacement pump and an auxiliary pump which are arranged in the same casing.

According to the invention in another aspect, a a single control element is employed for adjusting pump displacement and for operating a valve which controls the delivery of liquid to the motor.

According to the invention in another aspect, the transmission is provided with a valve which connects the two sides of the hydraulic circuit to each other when the variable displacement pump is at zero stroke.

The invention is exemplified by the hydraulic transmission illustrated in the accompanying drawings in which the views are as follows.

The transmission, for the purpose of explanation, may be divided according to function into the following parts:

1. A pump housing which encloses the principal working parts and serves as a reservoir for the motive liquid.
2. A variable displacement pump.
3. A constant displacement pump.
4. A hydraulic circuit including a control valve for controlling pump delivery.
5. Control mechanism for adjusting the variable displacement pump and for operating the control valve.

*1. The housing*

The housing comprises a lower combined supporting base and oil sump A. It may be provided with supporting lugs $A^1$. Above the base is a middle section $A^2$ bolted or otherwise fastened to the base. Across this middle section extends a deck $A^3$. To the lower flange $A^4$ of such middle section is secured by suitable fastenings a gear pump casing $A^5$, which also serves as a support for the control valve. Upwardly projecting from the deck $A^3$ is a hollow post $A^6$ adapted to serve as a pivot support for the variable delivery pump. $A^7$ is a cover or top section bolted to the body $A^2$ and $A^8$ is a closure plate closing the upper end thereof.

*2. The variable delivery pump*

The variable delivery pump comprises a short stub shaft B mounted in ball bearings $B^1$ in the deck $A^3$ and in the bushing $B^2$ in the gear pump casing $A^5$. $B^3$ is a spiral gear keyed to its shaft in mesh with another spiral gear $B^4$ keyed to a horizontal driving shaft $B^5$ which shaft may be driven by any suitable source of power, preferably controlled by the spindle of the lathe or directly driven from whatever source of power drives the spindle so as to stop and start with the spindle. $B^6$ is a driver or driving disc mounted on the upper end of the shaft B. This driving disc has on its upper face a plurality of outer lugs $B^7$ and inner opposed lugs $B^8$. These lugs are staggered and have opposed parallel surfaces. The outer lugs $B^7$ have secured to their inner surfaces roller paths or plates $B^9$.

Figure 11:
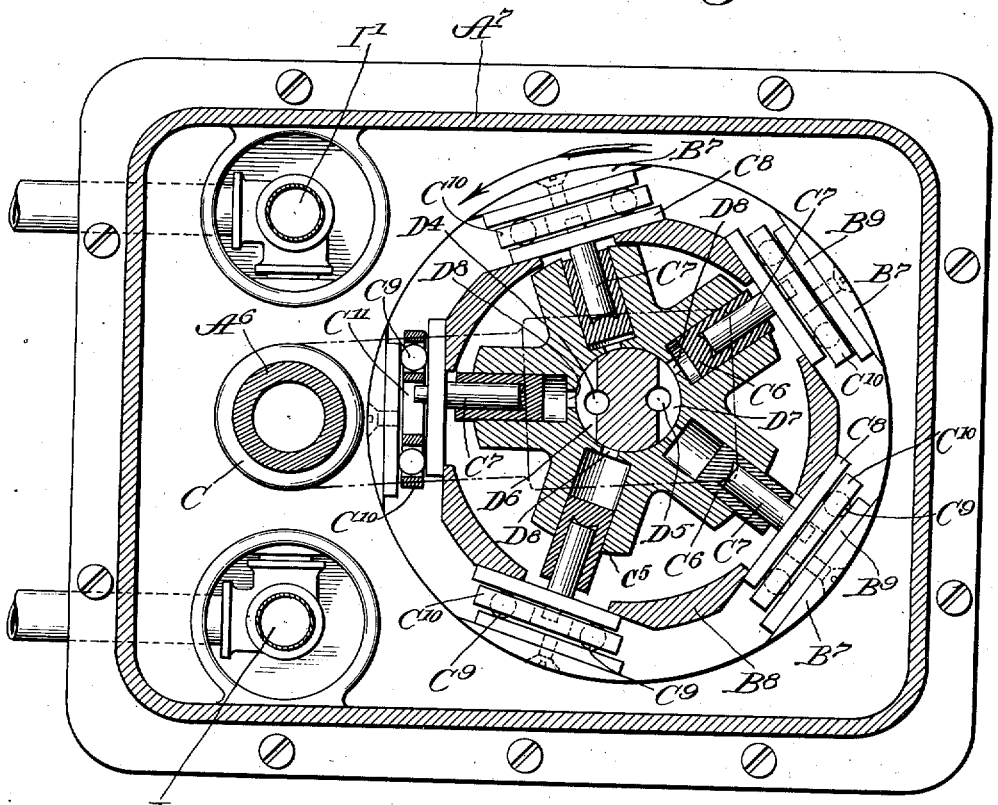
Fig. 11 is a sectional plan view taken on the line 11—11 of Fig. 1.

C is a hub rotatable on the post $A^6$ having projecting therefrom a swinging arm $C^1$ ending in a hollow block $C^2$ in which is rigidly mounted the pintle $C^3$. $C^4$ is a cylinder barrel mounted for rotation on the pintle $C^3$ inside the driver $B^6$. Projecting radially from this cylinder barrel are a series of cylinders $C^5$ $C^5$. Hollow plungers $C^6$ $C^6$ are mounted for reciprocation within these cylinders and contain push pins $C^7$ $C^7$ rigidly attached at their outer ends to the crossheads $C^8$ which are in slidable engagement with the surface on the inner lugs $B^8$ and on their outer sides engage rollers $C^9$ carried by the roller cage $C^{10}$, the rollers being in engagement also with the inner surfaces of the roller plates $B^9$. The push pins extend through the crossheads to engage and limit the movement of the roller cages with respect to the crossheads as indicated in Fig. 11, the roller cage being slotted as at $C^{11}$, so that any overtraveling of the roller cage in either direction brings the end of the slot into engagement with the projecting end of the push pin.

The oil or other hydraulic fluid is conducted to and discharged from the variable delivery pump through the flexible conduits D $D^1$, which conduits may serve interchangeably depending on the direction of operation of the pump as high pressure or low pressure passages. These flexible conduits terminate in fixed couplings $D^2$ $D^3$ at one end and communicate with the hollow head $C^2$ and so with the pintle at the other end. The pintle is provided with two separate ducts $D^4$ $D^5$ extending longitudinally therethrough and these ducts communicate with ports $D^6$ $D^7$ in the face of the pintle registering with the ports $D^8$ at the bottoms of the cylinders.

The ports $D^8$ are reduced so that there is a hydraulic component tending to move each cylinder on the pressure side inwardly toward the center. This hydraulic component tends to balance the wedging component of the liquid tending to leak out between the pintle and the cylinder barrel and to force the cylinder barrel away from center in the direction of the pressure side. The operation of the pump will be obvious from the drawings. The cylinder barrel is eccentric with respect to the driver and as the two rotate in unison the plungers have a reciprocating motion in the cylinders. The plunger on one side of the pintle moves outwardly through substantially an entire half circle drawing working fluid through the low pressure ports into each successive cylinder, and as each successive cylinder and plunger moves past the dead center, the successive plungers commence to move in and expel the working fluid at high pressure through the high pressure port.

Here it must be understood that if the eccentricity of the driver with respect to the pintle be reversed, what were high pressure out-going ports become the low pressure incoming ports and what were the low pressure incoming ports become the high pressure out-going ports.

*3. The constant delivery pump*

Figure 10:
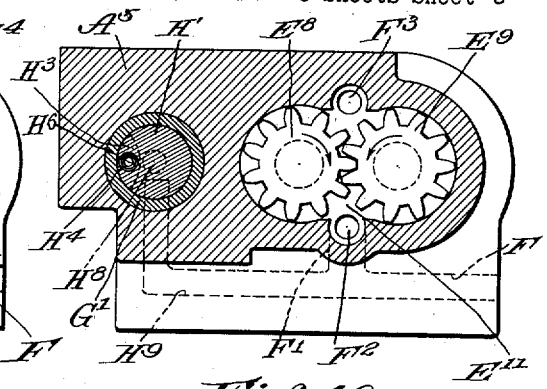
Fig. 10 is a sectional plan view taken on the line 10—10 of Fig. 1.

E is a horizontal pump drive shaft mounted in a ball bearing $E^1$, the bearing itself being held in position by a gland $E^2$ in the wall of the body $A^2$, the inner race of the bearing being held in position on the shaft by means of the nut $E^3$ screw threaded on the shaft. The shaft is driven by any suitable source of power not here shown. The inner portion of the shaft is rotatably mounted in a bearing $E^4$ supported on the deck $A^3$ and carries a mitre gear $E^5$ in mesh with a mitre gear $E^6$ on the pump shaft $E^7$ which shaft projects upwardly out of the gear pump casing $A^5$. Keyed on the shaft $E^7$ is a pump gear $E^8$ located within the gear casing and in mesh with a similar gear $E^9$ keyed to the shaft $E^{10}$. These two pump gears are closely fitted for rotation within the pump chamber $E^{11}$ closed at its lower end by the cover $E^{12}$. The pump rotates in the direction shown by the arrows on Figure 10.

*4. Hydraulic circuit*

F is a supply or make-up passage in the cover $E^{12}$ and submerged beneath the level of the oil or liquid in the reservoir or housing A. This make-up passage is in the form of a groove in the inner face of the cover and has an inwardly extending leg $F^1$ terminating beneath the passage $F^2$ which extends upwardly to discharge into the intake side of the pump chamber $E^{11}$. The oil which is forced through the gear pump by the teeth is discharged from the pressure side into the vertical passage $F^3$ which extends both above and below the pump chamber. The lower end of the passage $F^3$ discharges into the passage $F^4$ which terminates at the inner end of the leg $F^1$ of the make-up groove in the cover and is closed by a ball check valve $F^5$ seated by the spring $F^6$ whose tension may be regulated by the screw plug $F^7$, $F^8$ being a rotating and guiding pin on the screw plug, the purpose of this arrangement being to permit the liquid forced by the pump to short-circuit and be discharged through the high pressure relief valve when the pressure in the balance of the system exceeds a predetermined maximum.

Figure 4:
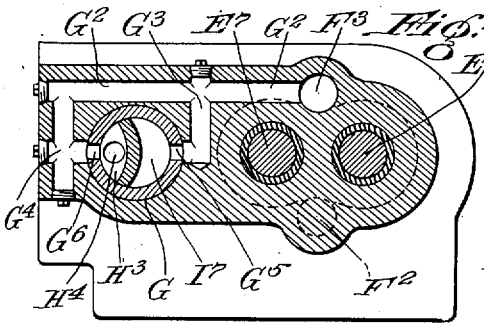
Fig. 4 is a sectional plan view taken on the line 4—4 of Fig. 1.

G is the distribution valve housing supported by and downwardly depending from the deck $A^3$ and formed integrally with the gear pump housing $A^5$. $G^1$ is the distribution valve seat contained within the housing G and provided with various ports as will hereafter appear. $G^2$ is a passage communicating at one end with the upper end of the passage $F^3$ and having branches $G^3$ and $G^4$ communicating respectively with ports $G^5$ and $G^6$ in the distribution valve seat $G^1$ as shown in Fig. 4 which is a section along the line 4—4 of Fig. 1.

Figure 1:
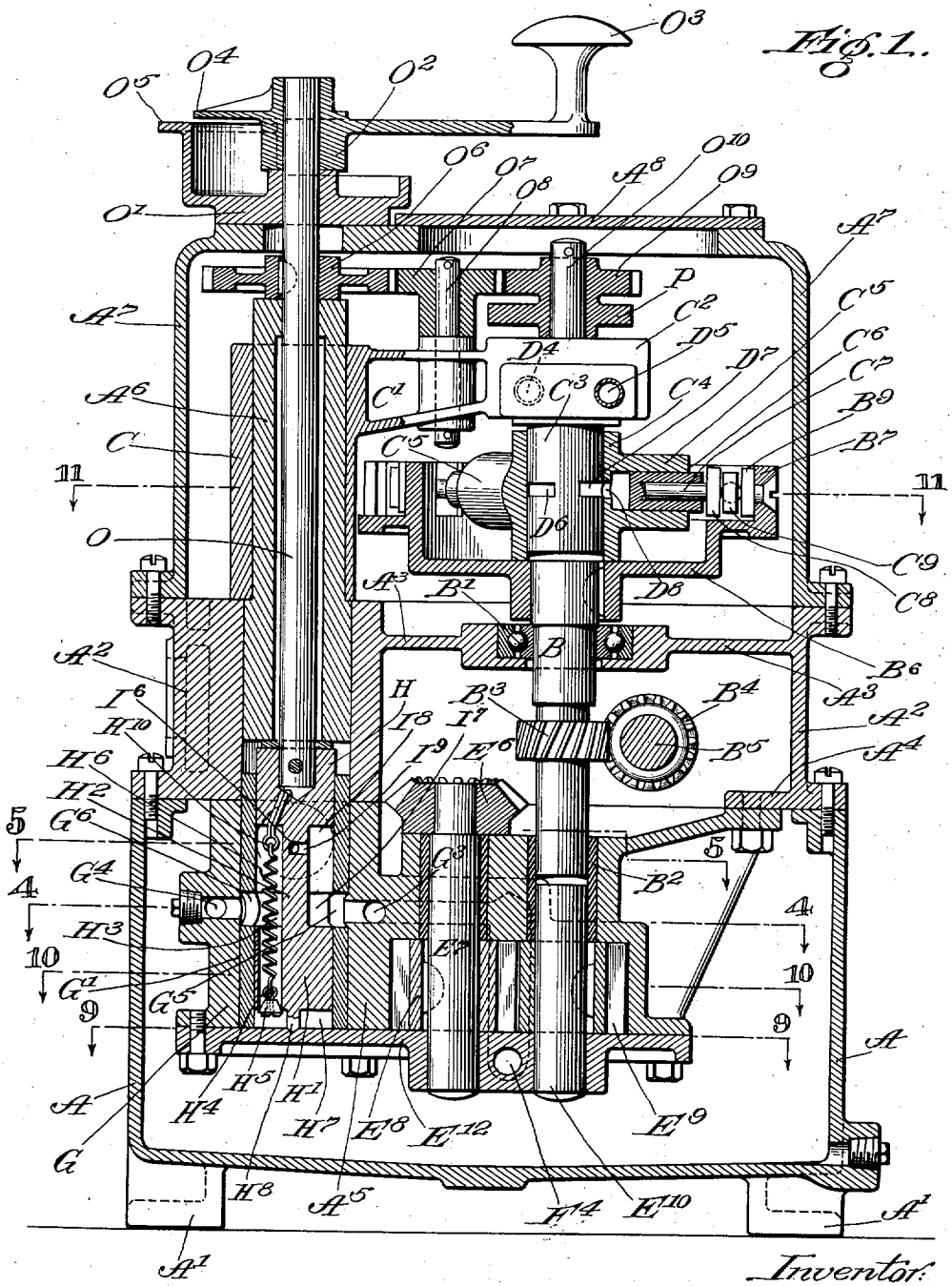
Fig. 1 is a central vertical section through a pump unit which forms a part of the transmssion, the view being taken substantially on the line 1—1 of Fig. 2.

The distribution valve which is rotatably mounted in the valve seat $G^1$ comprises an upper cylindrical head H seated upon the seat all the way around and a lower cylindrical head $H^1$ seated upon the seat all the way around and joined by a web $H^2$ of irregular cross section, both cylindrical heads and the edges of the connecting web being closely fitted within the bore of the casing of the seat $G^1$. This web is so arranged and positioned as to provide on the left hand side as shown in Figure 1, a valve chamber $H^3$ extending through an angle of about 120 degrees and adapted to be in register with the port $G^6$ through a wide range of rotation of the valve. $H^4$ is a duct leading from the chamber $H^3$ downwardly through the valve head $H^1$. This duct is closed at its lower end by a low pressure relief valve $H^5$ seated by the spring $H^6$. This conduit $H^4$ discharges into an annular chamber $H^7$ formed between the gear chamber cover $E^{12}$ and the lower end of the valve, the valve being supported on the cover for this purpose by the lug $H^8$. $H^9$ is a passage in the face of the gear casing cover communicating at one end with the annular chamber $H^7$ and at the other end with the make up passage F and the leg $F^1$. The passages just described are those which permit circulation of oil by the gear pump when no useful work is being accomplished with the exception of replacing leakage and maintaining the initial pressure to prevent the formation of vacuum and air pockets. This causes the gear pump to replace leakage and maintain said circulation with a minimum expenditure of power. $H^{10}$ is a branch extending upwardly from the chamber $H^3$ and adapted to register selectively with the ports $I^4$ and $I^5$, the branches $I^8$ and $H^{10}$ being adapted to be in communication respectively with one or other of the opposed ports $I^4$ and $I^5$ when the controller lever is at one or other of the 90 degree positions for quick traverse.

I and $I^1$ are distribution mains communicating with the couplings $D^2$ $D^3$ and therefore, in series with the adjustable feed pump through the passages D, $D^5$, $D^4$, $D^1$. $I^2$ $I^3$ are branches extending inwardly from the mains I $I^1$ and registering with the ports $I^4$ $I^5$ in the valve seat $G^1$, which two ports may be in register with a transverse by-pass passage $I^6$ formed in the valve web $H^2$. At either end of the by-pass passage $I^6$ are angularly extended pockets $I^{16}$ $I^{26}$ in the periphery of the valve body for the purpose of permitting a considerable angular movement of the valve before interrupting the return of the make up fluid through the by-pass passage to the low pressure side of the system. $I^7$ is a chamber formed in the valve body in register with the port $G^5$ and extending through such an angle that the port and chamber are in register at all angular positions of the valve. $I^8$ is a branch extending upwardly from this chamber and adapted to communicate with either of the two ports $I^4$ $I^5$ through the make up opening $I^9$ and by-pass passage $I^6$. This branch $I^8$ is also adapted selectively to be brought into direct register with the ports $I^5$ or $I^4$ when the valve is rotated from the position shown for instance in Fig. 5 to the position shown in Fig. 7, thereby throwing the entire discharge of the gear pump selectively into either port. It will thus be seen that when the distribution valve is in position shown in Figure 5, the discharge of the gear pump is in communication, through branch $I^8$, make up opening $I^9$, by-pass $I^6$ with both ports $I^4$ and $I^5$, and is hence in position to replace leakage occurring anywhere in the system. With the distribution valve in the position shown in Figure 6 or in the symmetrical position on the other side of the center line from the position shown in Figure 6, the gear pump discharge is cut off from port $I^4$ or port $I^5$ respectively but remains so positioned as to make up leakage occurring from those parts of the system which are in communication with port $I^5$ or port $I^4$ respectively which as will hereinafter appear, is the low pressure side of the system, this make up coming through the branch $I^8$, make up opening $I^9$, by-pass $I^6$, and pocket $I^{16}$ or $I^{26}$ to ports $I^4$ or $I^5$ as the case may be, the pockets permitting this to continue even after the valve has rotated far enough to bring the by-pass passage with the pockets out of line with the ports.

The mains I $I^1$ communicate with opposed ends of the motor cylinder K. For the purpose of illustration I have shown this motor cylinder K with a piston $K^1$ driving a piston rod $K^2$ which in turn propels a tool carriage $K^3$ on a lathe bed $K^4$, though of course, any desired tool or apparatus might be operated by this motor. In the operation of any such device as this, there will always be some immovable obstacle or stop at which the motor parts may come to rest. This might for instance be the ends of the cylinder. In many machine tools such a stop would be intentionally designed and would be adjusted in position at the will of the operator. In the present illustration, $K^5$ is a lug extending down from the carriage and adapted to travel along an adjusting screw $K^6$. $K^7$ and $K^8$ are stop nuts positioned on this screw and adapted to be set in position by the operator to limit movement of the carriage by engagement with the lug $K^5$. When the tool carriage or whatever part is being driven by my apparatus comes to the end of its travel, the motor ceases to function but the pump will keep right on building up pressure and in order that no harm may be done by this, I provide a by-pass pipe $K^9$ extending across between the mains I $I^1$ and located in parallel with the motor between the two mains. This by-pass pipe or line is associated with some kind of a pressure relief valve. In the preferred form, I have shown the pressure relief valves $K^{10}$ $K^{11}$ associated with the mains I $I^1$, the valve $K^{10}$ being adapted to open under excessive pressure in the main I, the valve $K^{11}$ being adapted to open under excessive pressure in the main $I^1$, each of these relief valves being adapted to permit unobstructed flow of fluid in the direction opposite to its pressure releasing direction. The purpose of having two separate valves instead of a single relief valve adapted to open in both directions or a double acting valve is that it may be possible to separately set these valves to release under different pressures because under ordinary conditions, it is desirable to have different maximums for forward movement and reverse.

The description of one of these pressure relief valves will suffice for both. M is the valve housing. The main $I^1$ communicates with the valve at one end and the bypass pipe $K^9$ at one side of the housing. $M^1$ is a hollow plunger slidably mounted in the neck of the valve. This plunger is enlarged at its end as at $M^2$ and held upon a seat around the valve neck by means of the spring $M^3$, the compression of this spring being adjustable by means of a plunger $M^4$ screw threaded in the valve body and adapted to be rotated to tighten or loosen the spring by the handle $M^5$. $M^6$ $M^6$ are ports in the wall of the hollow plunger closed while the plunger is in its normal seated position, but adapted to be opened after a sufficient movement of the plunger in the direction opposed to the pressure exerted by the spring so as to permit the liquid to flow out through the plunger and the ports when the pressure is great enough to compress the spring. $M^7$ is a passage through the end of the plunger closed by a ball check valve $M^8$ against fluid attempting to pass in the direction opposed to the spring pressure. The lift of the ball is limited by the pin $M^9$, when the liquid flow takes place in the opposite direction.

5. *The control mechanism*

O is the distributing valve stem. It is pinned at its lower end to the valve body penetrating within the head H thereof and passes up through the hollow post $A^6$ and through the hub $O^1$ which gives it a bearing at the top of the housing. $O^2$ is a lever keyed to the valve stem and having a manipulating handle $O^3$ and a pointer $O^4$ adapted to travel along the graduated limb $O^5$ mounted on the housing. $O^6$ is a gear keyed on the valve stem inside the housing. This gear is in mesh with an idler $O^7$ mounted on the pin $O^8$ on the swinging lever $C^1$. $O^9$ is a pinion in mesh with the idler $O^7$ and mounted for rotation on a pin $O^{10}$ projecting upwardly from the pintle $C^3$.

$P^1$ is a cam preferably integral with or at least rigidly mounted in the hub of the pinion $O^9$ and having its working face in engagement with a roller $P^1$ which is mounted in an abutment or lug $P^{21}$ extending inwardly from the wall of the housing $A^7$. $P^2$ is a spring interposed between the swinging arm and the housing wall adapted to hold the cam and roller firmly in working engagement one with another. The neutral, central or intermediate portion of the cam between the points $P^3$ $P^4$ is circular so that rotation of the cam through an angle of 17 degrees each way from the central position does not result in any swinging of the arm $C^2$. The cam radii are progressively greater than the radius of the arc $P^3$ $P^4$ in one angular direction from the central point and progressively less in the opposite direction. Rotation of the cam in one direction moves the swinging arm in a clockwise direction while a reverse rotation of the cam moves the swinging arm in the opposite direction and since the pintle of the variable stroke pump is mounted on the swinging arm, movement of the cam results in relative displacement of axes of rotation of the driver and cylinder barrel in one direction for forward movement and in the other direction for reverse. These two cam surfaces extend approximately 72 degrees away from the end of the central circular portion to the points $P^5$ $P^6$, and from these points on to $P^7$ $P^8$ for about 35 degrees, the cam is again at both ends circular. The reason for this arrangement is that it is necessary as the lever commences to rotate, for the distribution valve to have sufficient annular movement to close off the bypass $I^6$ at the beginning of the working cycle, then as the cam rotates, the pump is thrown into operation by displacement of the pintle axis and this displacement continues in one direction or the other until maximum stroke of the pump has been reached at about 90 degrees each way from zero position of cam P. But this does not give maximum feed because for quick traverse, I want to add to the fluid displaced by the variable displacement pump the relatively greater amount of fluid displaced by the gear pump and this must be done without interfering with the continued operation of the variable pump. As the cam continues its rotation beyond the points $P^5$ or $P^6$, no further change in axial relations takes place because the cam is now circular, but during this period, the lever continues to rotate the distribution valve to throw the full displacement of the gear pump into the high pressure main and to add it to the displacement of the adjustable pump so as to give the maximum volume of working fluid and consequent maximum speed of rapid traverse.

*General*

S is a shaft driven from the lathe head stock. It carries the pulley $S^1$ which drives the belt $S^2$ travelling around the pulley $S^3$ on the shaft $B^5$, so that in the apparatus I have used to illustrate my invention, the variable pump driving shaft is driven only when the lathe spindle or head stock is driven.

The make-up circuit is normally a separate circuit through which the make-up liquid is circulated under low or make-up pressure by the gear pump. The working circuit, containing as it does a high and low pressure branch, a motor and a variable displacement pump, is also normally a separate circuit. The only connection between these two circuits when feeding is going on is through the make-up passage in the valve, and as long as leakage is taking place there will be a flow through this passage from the make-up circuit into the low pressure side of the working circuit. However, when the motor is moving back so that the piston rod is coming into the system, the displacement of the piston rod is greater than any possible leakage, and therefore the volume of liquid which can be maintained in the system decreases and this results in forcing liquid out against the normal make-up flow back into the make-up system and thence through the low pressure or make-up pressure relief valve in the reservoir.

In the mechanism described, the make-up circuit, including the gear pump and low pressure relief valve, thus serves not only to replenish the working circuit with oil to compensate for leakage losses but also to maintain the working circuit flooded during variations in volumetric capacity therein caused by movement of the piston rod inwardly and outwardly of the left end of the power cylinder. As the piston rod moves into the left end of the cylinder, oil is forced out of the return side of the working circuit through the low pressure relief valve and, as this rod moves out of the cylinder, a fresh body of oil from the gear pump is forced into the return side of the working circuit to compensate for this increase in volumetric capacity in the circuit. This repeated action of forcing oil from the circuit during decrease in volumetric capacity of the circuit and returning fresh oil to the circuit during increase of capacity thereof tends to keep the circuit free from entrained air. Furthermore the fact that the return side of the circuit is always flooded with oil under pressure insures prompt action of the piston upon each reversal of flow in the circuit.

Figure 2:
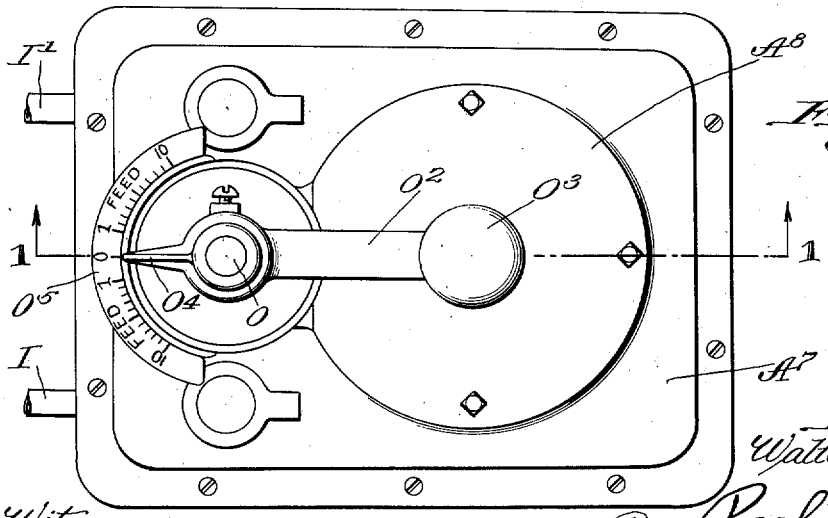
Fig. 2 is a top plan view of the pump unit.
Figure 3:
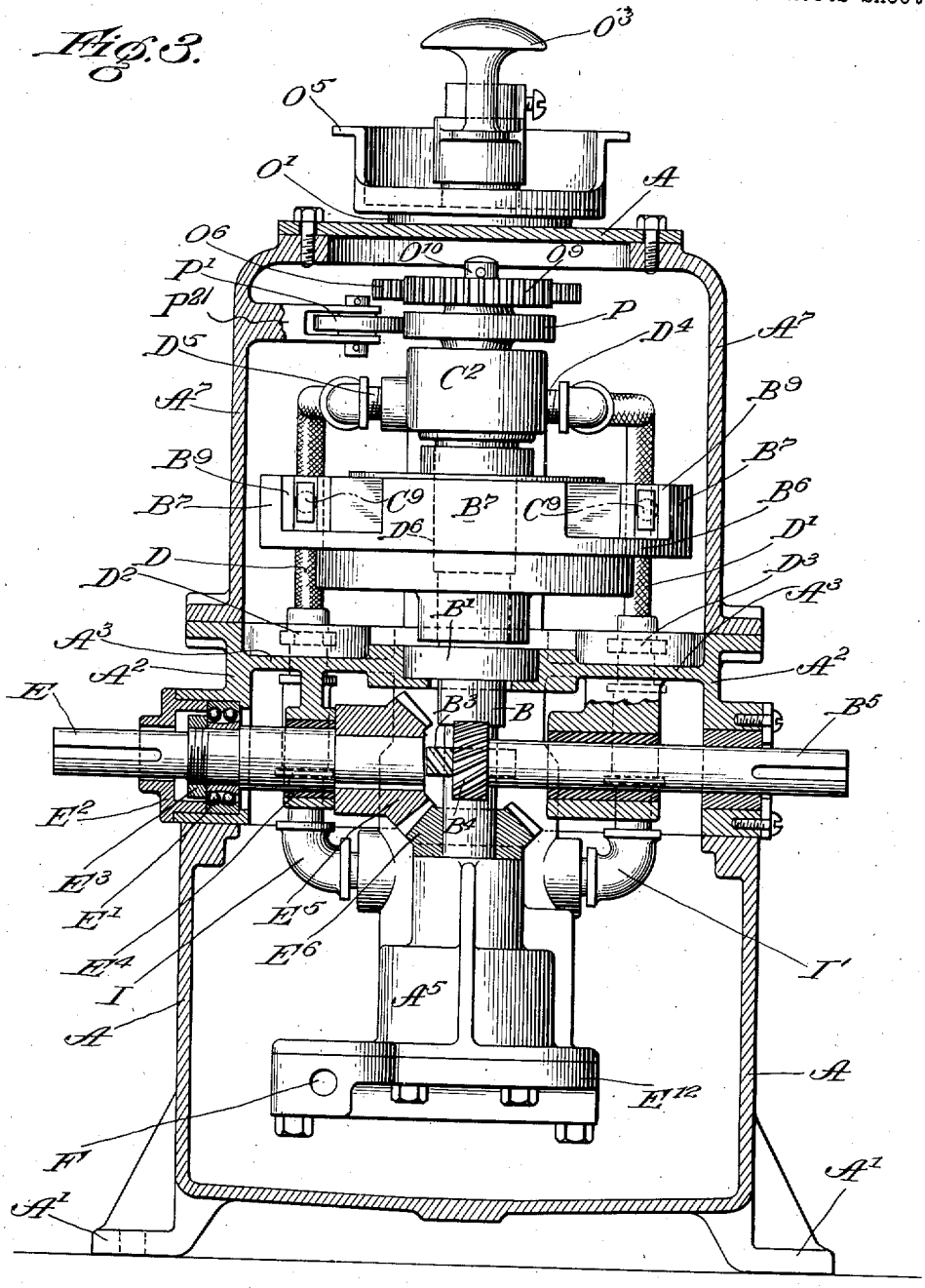
Fig. 3 is a vertical section taken through the pump unit at right angles to the line 1—1 of Fig. 2 and with certain parts shown in full.
Figures 8, 13:
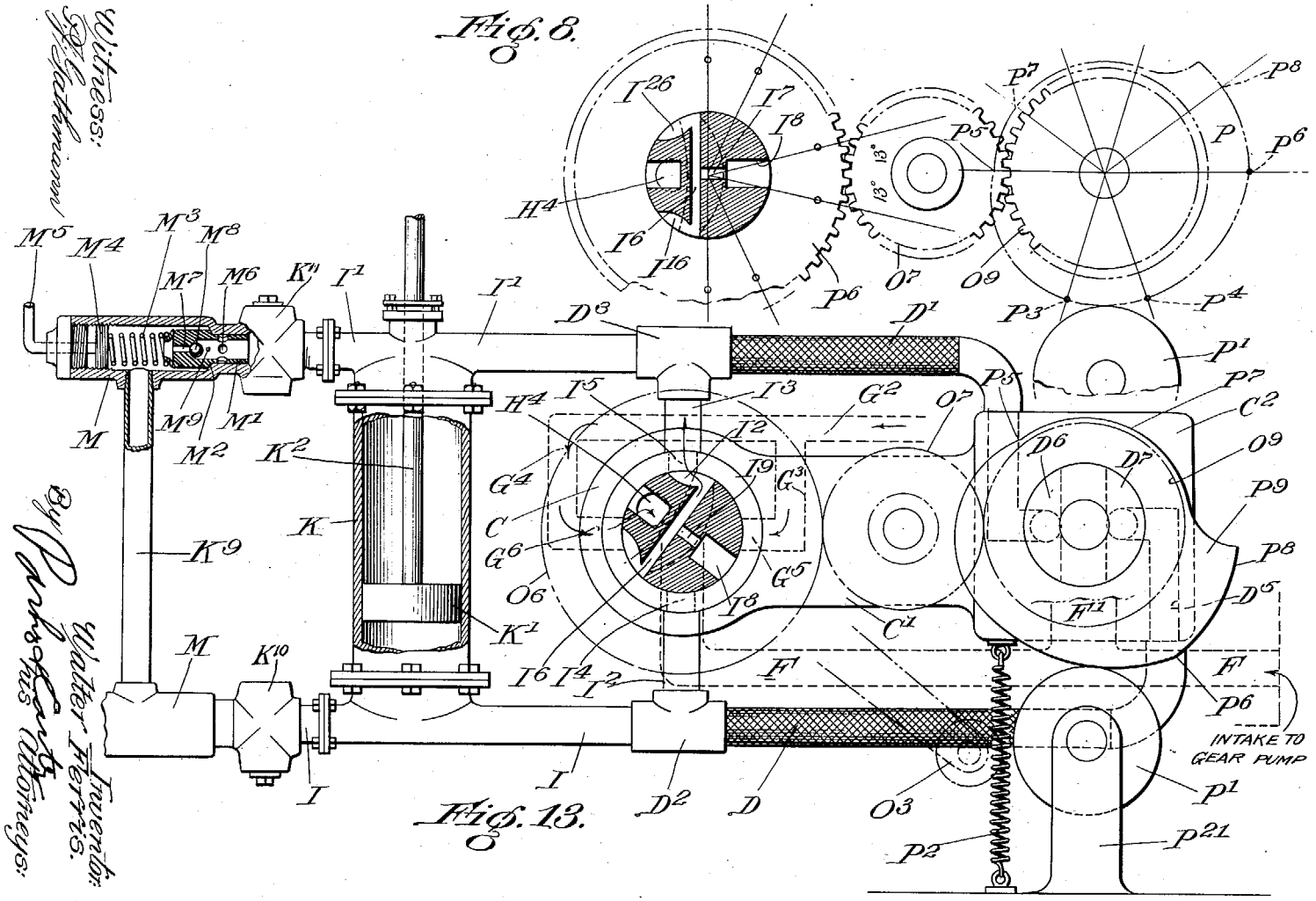
Fig. 8 is a schematic drawing showing the control valve and the stroke changing cam connected by gears to each other for simultaneous operation.
Fig. 13 is a schematic drawing showing characteristics of the hydraulic circuit and the stroke changing cam.

It will be noted that adjustment of the control lever $O^2$ through an angle of approximately sixty degrees in either direction from the neutral position of Figure 2, effects a corresponding angular adjustment of the distribution valve, and a simultaneous adjustment of the control cam P through an angle of approximately ninety degrees in either direction from the neutral position of Figure 8. In all positions of the valve, within this range, the chamber $H^3$ thereof is open to the port $G^6$, so that passage $H^4$ is open to the gear pump through passage $G^4$ and the pressure in the gear pump circuit is thus determined by the low pressure relief valve $H^5$. During clockwise adjustment of the lever $O^2$ from neutral into this sixty degree position, branch $I^{26}$ of the valve is open to port $I^5$, so that pipe $I^1$ is open to the gear pump through passage $G^3$, chamber $I^7$, passage $I^8$ and pipe $I^3$; and the high portion of the cam P (between points $P^4$ and $P^6$) bears upon the roller $P^1$, so that the variable displacement pump delivers liquid through pipes D and I and liquid returns to the variable displacement pump through pipes $I^1$ and $D^1$. During counter-clockwise adjustment of the lever $O^2$ from neutral into the sixty degree position branch $I^{16}$ is open to port $I^4$, so that pipe I is open to the gear pump; and the low portion of cam P (between points $P^3$ and $P^5$) bears upon roller $P^1$, so that the variable displacement pump delivers into pipes $D^1$ and $I^1$, and pipes D and I then constitute the return side of the circuit. Thus during adjustment of the control lever $O^2$ between these sixty degree limits, the displacement of the variable displacement pump is adjusted from zero to a maximum in either direction, and in all positions of the lever between these positions the gear pump is connected to the return side of the circuit and maintains the same flooded with liquid under pressure, the degree of pressure therein being determined by the valve $H^5$. The gear pump is thus connected in series with the variable displacement pump. The maximum pressure in the working side of the main circuit is determined by the high pressure relief valves $K^{10}$ or $K^{11}$.

Figure 7:
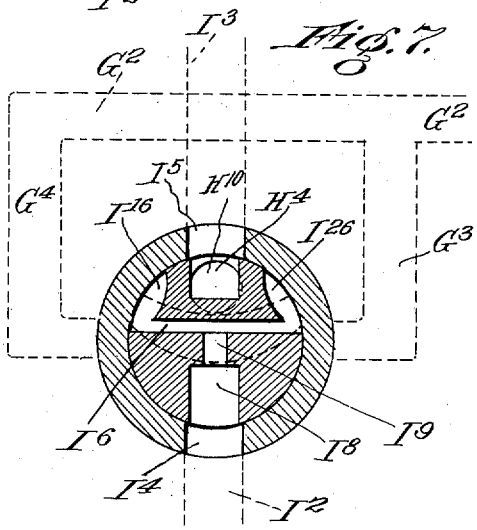
Fig. 7 is a view similar to Fig. 6 but showing the control valve turned to one of its two quick traverse positions, the other quick traverse position being with the valve rotated through an angle of 180° from the position shown.

Adjustment of the lever $O^2$ clockwise thru an angle of ninety degrees from neutral, turns the distribution valve through a corresponding angle into the position of Figure 7, in which position chamber $H^3$ is opened to port $I^5$ through passage $H^{10}$, and chamber $I^7$ is opened to both ports $G^5$ and $G^6$ and to port $I^4$ through passage $I^8$. Cam P is simultaneously adjusted so that roller $P^1$ engages the circular portion $P^6$—$P^8$ of the cam and the variable displacement pump delivers liquid through pipes D and I, liquid returning to this pump through pipes $I^1$ and $D^1$. In this position of the valve fluid from the gear pump is delivered from passages $G^3$ and $G^4$, through chamber $I^7$, port $I^4$ and pipe $I^2$ into pipes D and I, so that this fluid is added to the fluid discharged by the variable displacement pump, to increase the flow in the circuit. The gear pump is thus connected in parallel with the variable displacement pump. With the parts in this position any excess liquid within the return side $I^1$—$D^1$ of the main circuit is discharged through pipe $I^3$, port $I^5$, passage $H^{10}$, chamber $H^3$, and passage $H^4$ past the low pressure valve $H^5$. Under this condition the highest pressure obtainable within the working side of the circuit is determined by the valve $F^5$ which determines the maximum gear pump pressure. With the handle $O^2$ adjusted into the opposite ninety degree position, the discharge from the variable displacement pump is reversed, so that pipes $I^1$ and $D^1$ become the working side and pipes I and D the return side of the circuit, and the valve connections are reversed so that the entire discharge of the gear pump is delivered through pipe I into the working side of the circuit.

Experience shows, however, that under this condition it may happen that while the large capacity pump is diverted from its make-up function the pressure on the low pressure side will drop below the point necessary to keep the pistons in the variable displacement pump tight, and this results in rattling and irregular operation of the variable displacement pump; and so for many conditions it is desirable to use a control cam so arranged that at the end of the movement, when the variable displacement pump reaches its maximum, the pump is suddenly, by further movement of the control lever, thrown back to the zero position, and under this condition the make-up pump alone circulates the hydraulic fluid for quick traverse.

Figure 14:
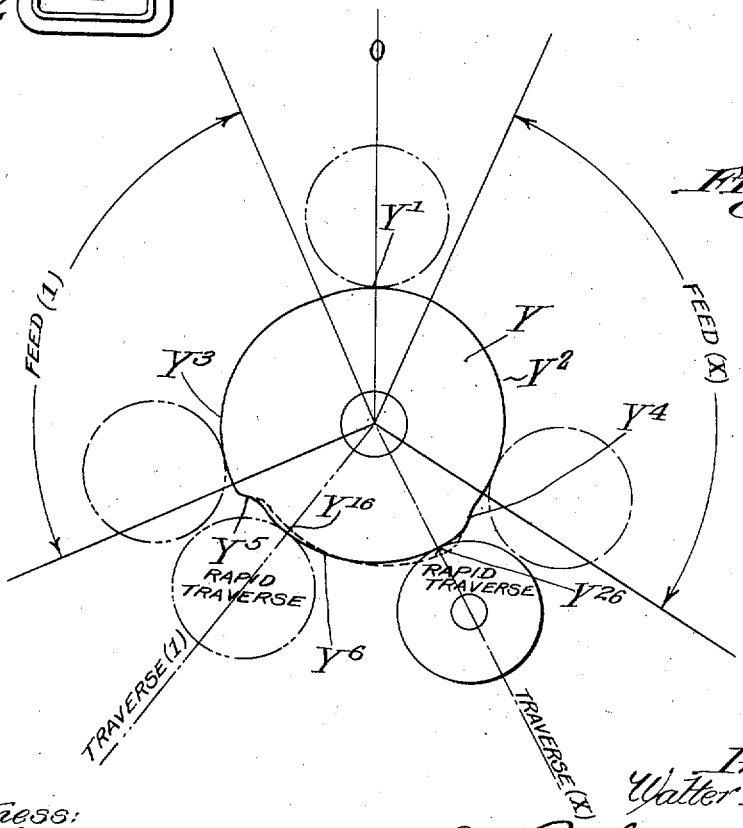
Fig. 14 is a diagram showing a modified form of stroke changing cam.

An arrangement for this purpose is shown in Fig. 14, wherein the cam Y is substituted for the cam P, and this cam has a neutral or circular surface $Y^1$, with cam surfaces $Y^2$, $Y^3$ adapted to control and vary the eccentricity of the pump and sudden sharp return surfaces $Y^4$, $Y^5$ leading to a cylindrical surface $Y^6$ having the same radius as $Y^1$, so that at both ends of its movement the controller lever causes the displacement of the variable displacement pump to return to zero.

In order to insure the return of the feed pump stroke to a position where the inner ends of the plungers will be subjected to the delivery pressure of the gear pump during quick traverse, I have found it advisable in some cases to make the cam surfaces $Y^6$ not truly circular as above described, but to form the surface at $Y^{16}$ with a radius slightly less than $Y^1$ so that the roller on leaving the high surface $Y^3$ will pass to a position which will slightly reverse the feed pump, instead of attempting to return it exactly to zero position. For the same reason the surface at $Y^{26}$ may be formed with a radius slightly greater than the radius at $Y^1$.

Figure 5:
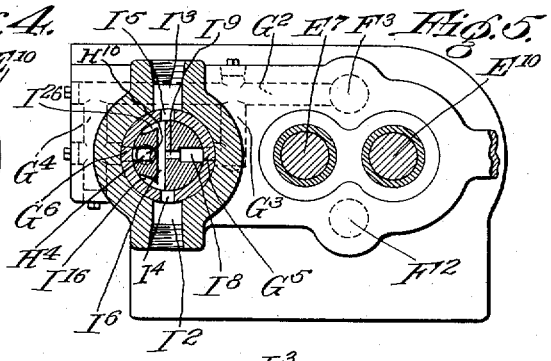
Fig. 5 is a sectional plan view taken on the irregular line 5—5 of Fig. 1 and showing the control valve in its neutral position.

It will be noted that when the distribution valve is in the intermediate position of Figure 5 the passage $I^6$ is open to both ports $I^4$ and $I^5$, so that pipes I and $I^1$ communicate therethrough. The pump circuit, including pipes D and $D^1$, is thus by-passed, and the opposite ends of the power cylinder K are also in open communication. The piston $K^1$ is thus free to move lengthwise of the cylinder permitting the operator to move the tool carriage $K^3$ by hand along the bed of the lathe.

*Operation*

Figure 12:
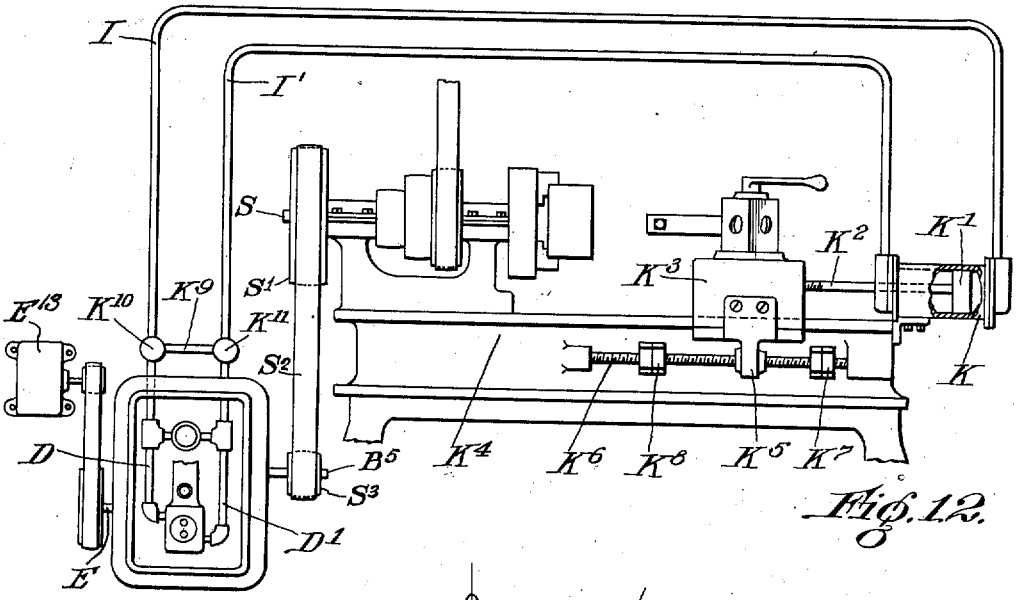
Fig. 12 is a schematic drawing showing the transmission applied to a lathe.

A description of the operation of the machine will now be given. Let it be assumed that the entire system has been filled with oil in the usual manner; that the motor $E^{13}$ has been started so that the shaft E and gear pump are rotating at constant speed; that the lathe spindle S has been started so that the variable displacement pump is rotating at a corresponding, substantially constant speed; that the tool carriage $K^3$ and piston $K^1$ are in the positions of Figure 12; and that the control lever $O^2$, distribution valve and cam P are in the positions indicated in Figures 2, 4, 5 and 8. With the valve and cam in this position, the two sides of the circuit are in open communication through pipe $I^3$ port $I^5$, passage $I^6$, port $I^4$ and pipe $I^2$, and the variable displacement pump is in zero displacement position, so that piston $K^1$ and the tool carriage $K^3$ are at rest. It will also be noted that the gear pump is connected to both sides of the circuit through passage $G^3$, port $G^5$, chamber $I^7$, and passages $I^8$, $I^9$ and $I^6$, and also connected through passage $G^4$, port $G^6$, chamber $H^3$ and passage $H^4$ leading to the low pressure relief valve H. Both sides of the circuit are thus maintained flooded with liquid, at a low pressure determined by the valve $H^5$, the excess liquid discharge past this valve returning to the gear pump through passages $H^9$, F, $F^1$ and $F^2$.

When the operator wants to start up the feed, he moves the controller handle to the right or left as the case may be. In Figure 13, I have shown the effect of moving it in a clockwise direction. The first thing that happens is that the distribution valve rotates and the by-pass passage $I^6$ is thrown out of register with the port $I^4$. This closes and interrupts the short circuit between the mains I, $I^1$. The rotation of the controller lever also rotates the train of gears at the top of the housing and rotates the controller cam. Since the central portion of this cam is cylindrical, the cam can rotate until the point $P^4$ passes the line joining the center of the cam P and the roller $P^1$ without causing any angular rotation of the swinging arm, the arm being firmly held against the abutment by the spring. This rotation of the cam and controller lever is sufficient to completely close the by-pass. Further rotation of the controller lever, however, brings that part of the cam having the progressively increasing radius into contact with the roller.

As shown in Figure 13, this rotation has continued until the roller engages the cam about one-half way between points $P^4$ and $P^5$ so that the swinging arm and pintle block are forced to one side to bring the eccentricity of the pintle with respect to the driver about one-half way between maximum and zero.

The variable displacement pump rotates in the direction of the arrows in Figure 11 counter-clockwise, and the result of this is that the right hand side of the variable delivery pump is the high pressure side and working fluid is discharged through the ports $D^8$ from the cylinders into the port $D^7$, thence through the passages $D^5$ and D, through the coupling $D^2$ to the passage I and thence to the head end of the motor K tending to force the piston $K^1$ toward the other end of the cylinder. Because the by-pass $I^6$ is out of register with the port $I^4$ and therefore closed and because the check valve $K^{10}$ is seated, all of the working fluid displaced by the variable delivery pump is employed in moving the piston $K^1$.

The working fluid on the other side of the piston $K^1$ travels from the cylinder K through the main $I^1$, the coupling $D^3$, the flexible tube $D^1$, the passage $D^4$ and the low pressure port $D^6$ into the various successive cylinders on the low pressure side of the variable delivery pump, thence being carried around and discharged on the high pressure side as the cylinders continue their rotation.

While this goes on, a certain amount of working fluid may have leaked out of the high pressure system between the working surfaces or through leaks in joints or anything of that kind, and this would leave if it were not filled up again, air pockets on the low pressure side. The make up required to replace this leakage is provided by the gear pump in the following manner:

If there were no leakage to be made up, the operation of the gear pump would circulate working fluid through the system in the following circuit from the pump chamber $E^{11}$ through the passages $F^3$, $G^2$, $G^4$, port $G^6$, chamber $H^3$, passage $H^4$ past the valve $H^5$ through the annular chamber $H^7$ into the passage $H^9$ and thence through the passage F, $F^1$, $F^2$ back to the intake side of the gear pump. If there is any leakage however to be made up, the make up material will leave the passage $G^2$, travel through the passage $G^3$, port $G^5$ to the chamber $I^7$, thence through the branch $I^8$ make up port $I^9$, by-pass passage $I^6$, pocket $I^{26}$, port $I^5$ and passage $I^3$ to discharge into the low pressure system or side at the coupling $D^3$. This will withdraw some of the gear pump discharge and in order to make it up, exactly the same amount of material that has leaked out and been replaced will be drawn into the gear pump system from the reservoir through the right hand end of the passage F. In order to work in the opposite direction, the operator merely swings the controller lever in the reverse direction and this will bring that part of the cam between the points $P^3$ and $P^5$ into engagement with the roller and will reverse the direction of eccentricity of the driver and cylinder barrel. When this is done, although the driver rotates in the same direction, what was the low pressure becomes the high pressure side of the system and vice versa, the pump then discharging its high pressure through the passages $D^4$ $D^1$ and $I^1$ to the piston rod end of the motor. Simultaneously the distribution valve will have been rotated in the opposite direction and the make up will then enter the main $I^2$ through the pocket $I^{16}$ and by-pass $I^6$ and there will be no connection between the high pressure side and the make up because the pocket $I^{26}$ and passage $I^6$ will be out of register with the port $I^5$. The direction of travel of the make up fluid, however, will remain constant in the gear pump system because the gear pump always rotates in the same direction, the distribution valve always functioning to conduct the make up fluid to the low pressure side of the system whichever that may be.

The rate of feed or travel provided by the variable delivery pump is comparatively slow and susceptible of exceedingly accurate adjustment, since the control lever has a relatively wide range of travel and the relation between rate of feed and position of control lever is exceedingly accurate and delicate. It frequently is highly desirable however to provide a quick traverse feed which needs to be much more rapid but does not need to be so accurately timed and controlled as the working feed or speed provided by the variable displacement pump. This quick traverse can be obtained by rotating the controller lever to the 90 degree position in either direction. When this is done, the extreme circular terminal face of the cam either on one side or the other, comes in contact with the roller at the end of the increasing or decreasing cam segment and there will at that point be no further angular displacement of the swinging arm and no further change in the eccentricity of the driver and cylinder barrel. But the further rotation of the controller handle shown for instance at the place at which $P^6$ comes in contact with the roller, will cause a further rotation of the distribution valve to the position shown in Figure 7, at which position the working fluid discharged by the gear pump passes along the passage $G^2$, divides and part of it comes through the passage $G^3$ and part through the passage $G^4$ into the chamber $I^7$, thence up through the branch $I^8$ discharging through the port $I^4$ and passage $I^2$ into the high pressure side of the system. This relatively large quantity of working fluid greatly accelerates the travel of the piston or motor because the volume displaced by the gear pump is much greater than the volume displaced by the variable delivery pump and in this case the two volumes are added to each other to produce increased speed or rate of displacement, this resulting in quick traverse of the machine or lathe carriage. The working fluid from the low pressure side of the motor is returned to the high pressure side partly by the variable delivery pump and partly by the gear pump. The working fluid handled by the gear pump passes from the main $I^1$ in Figure 13 through the coupling $D^3$, passage $I^3$ port $I^5$, branch $H^{10}$, chamber $H^3$, duct $H^4$, unseats the valve $H^5$, passes through the chamber $H^7$, passage $H^9$, passage F, passages $F^1$ and $F^2$ to the low pressure or intake side of the gear pump.

If quick traverse in the opposite direction were being provided, the controller lever would be rotated in the opposite direction 90 degrees from the neutral position shown in Figure 7 and in this case, the path of the discharge from the gear pump would be exactly the same up to the distribution valve, but would thence be through the port $I^5$, passage $I^3$, coupling $D^3$, to the main $I^1$ which would under these conditions be the high pressure main and the working fluid would be returned to the low pressure side of the two pumps through the main I, part going to the variable displacement pump through the conduit D and part to the gear pump through the conduit $I^2$, port $I^4$, through the distribution valve and back to the gear pump as above explained.

The system is adapted to work under various conditions under three different operating pressures each of them limited by a separate pressure relief valve and the system is so arranged that each separate pressure relief valve is only operative in the circuit when it is desired that it shall function.

There is first the make up relief valve. This is the valve $H^5$ located at the bottom of the distribution valve and set so that with the frictional resistance to the movement of the working fluid in the system, there will always be a minimum pressure of about fifteen pounds. Under some conditions, this valve might be altogether omitted, the frictional resistance of the passages to the flow furnishing sufficient make up pressure. All that is necessary is that there be enough pressure to insure the penetration of the make up supply of the working fluid into the low pressure side of the system to compensate for all leakage when useful work is being done and into both sides when the machine is idling.

Figure 9:
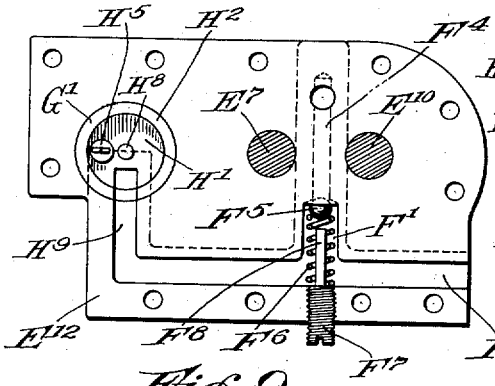
Fig. 9 is a sectional plan view taken on the line 9—9 of Fig. 1.

The next higher pressure involved is fixed by the quick traverse relief valve $F^5$ shown in Figure 9. When pressure on the high pressure side of the system with the controller valve in one or other of the 90 degree angles for quick traverse, exceeds a certain higher maximum, the pressure will unseat the valve $F^5$ and permit the working fluid discharged by the gear pump to pass in through the complete system, but to short circuit from the lower end of the passage $F^3$ through the by-pass passage $F^4$ back to the valve end $F^5$ which it unseats thence into the passage $F^1$ up to the passage $F^2$ to the lower pressure or intake side of the gear pump. This can only take place when the parts are in the position shown in Figure 7 or in the opposite 90 degree position and under such conditions as this, the make up relief valve $H^5$ has no effect because it is on the return or low pressure side and it continues the function of keeping the pressure on the low pressure branch of the gear pump circuit up to such point at which make up will take place, and does not in any way affect the operation of the quick traverse relief valve.

Figure 6:
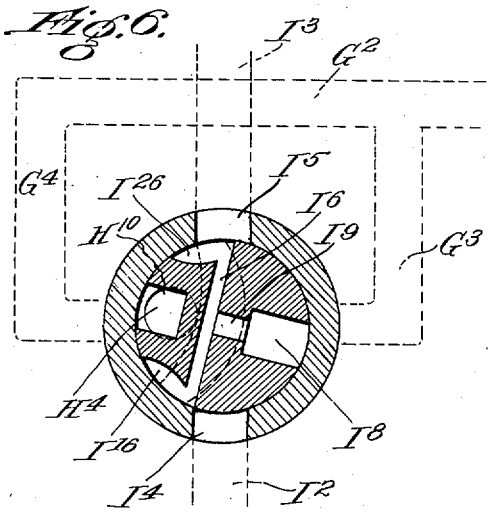
Fig. 6 is a sectional plan view taken in the same plane as Fig. 5 but showing the control valve in feed position.

When the distribution valve is in the range of feeding positions as exemplified in Figures 6 and 13, and especially the working position shown in Figure 13, there is no direct communication between the gear pump discharge and the high pressure side and therefore the gear pump pressure relief valve has no effect on the pressure in the high pressure circuit and the pressures may rise above the pressures at which the quick traverse pressure relief valve would operate. These higher feeding pressures are determined by one or more pressure relief valves. Preferably, each of the two pressure mains is provided with a relief valve in order to have different maximum pressures for feeds in opposite directions; but for the purpose of comparison we can consider these two pressures as one because only one of these pressure relief valves can operate at a time; the other having for the moment no working function. The tensions of these springs of these two valves $K^{10}$ $K^{11}$ can be separately adjusted and if I is the high pressure side, the valve $K^{10}$ will open and permit flow of working fluid through the by-pass $K^9$ and the valve $K^{11}$ when a certain predetermined pressure has been reached; and if the main $I^1$ is the high pressure main, the valve $K^{11}$ will open when a certain predetermined pressure has been reached to permit passage of the working fluid through the by-pass $K^9$ and the valve $K^{10}$ into the part which is then the low pressure main I.

The invention is hereby claimed as follows:

1. In a hydraulic transmission the combination of a hydraulic motor, a variable displacement pump for delivering a driving liquid thereto, means for regulating pump displacement to regulate the speed of said motor within a limited range, a second pump for driving said motor, valve mechanism for controlling the discharge from said second pump to increase the speed of said motor above said range, and a unitary means or controlling said displacement regulating means and said valve.

2. In a hydraulic transmission the combination of a hydraulic motor, a variable displacement pump for driving said motor at a variable rate within a limited speed range, a second pump for increasing the speed of said motor, a control element, means controlled by said element for regulating the displacement of said first named pump, and means controlled by said element for controlling the discharge from said second pump.

3. In a hydraulic transmission the combination of a hydraulic motor, a variable displacement pump, a hydraulic circuit directly connecting said pump and motor through which said motor is normally driven at a rate corresponding to pump displacement, means for regulating pump displacement, a second pump, and means adjustable to selectively connect said second pump with either the working side or the return side of said circuit.

4. In a hydraulic transmission the combination of a hydraulic motor, a reversible flow variable displacement pump for driving said motor at a variable speed in either direction, a second pump for driving said motor at an increased speed, valve mechanism for controlling communication between said second named pump and motor, and unitary control means for varying the displacement of said first named pump and for operating said valve mechanism.

5. In a hydraulic transmission the combination of a hydraulic motor, a variable displacement pump for delivering a driving liquid to said motor, a second pump for delivering a driving liquid to said motor, a control element, means responsive to movement of said element through a limited range for varying the displacement of said first named pump, and means responsive to movement of said element beyond said range for connecting said second named pump in driving relation with said motor.

6. In a hydraulic transmission the combination of a hydraulic motor, a reversible flow variable displacement pump for delivering a driving liquid to said motor, a second pump for delivering a driving liquid to said motor, a control element movable from a neutral position into an extreme position in either direction, means responsive to movement of said element for regulating the displacement of said first named pump and for reversing the flow thereof during movement of said element through neutral position to vary the speed and reverse said motor, and means responsive to movement of said element into either extreme position for connecting said second named pump in driving relation with said motor in either direction of operation thereof.

7. In a hydraulic transmission the combination of a hydraulic motor, a variable displacement pump for delivering a driving liquid to said motor, a second pump for delivering a driving liquid to said motor, displacement regulating means for said first named pump operable to regulate the flow therefrom, a valve mechanism for controlling the flow from said second named pump, and means for controlling said regulating means and said valve mechanism.

8. In a hydraulic transmission the combination of a hydraulic motor, a variable displacement pump for driving said motor, cam mechanism for regulating pump displacement, a second pump for driving said motor, valve mechanism for controlling the discharge from said second pump, and means for controlling said valve and cam mechanism.

9. In a hydraulic transmission the combination of a hydraulic motor, a variable displacement pump, cam mechanism for regulating pump displacement, a second pump, valve mechanism for controlling the discharge from said second pump, and a single control element for controlling said cam and valve mechanism.

10. In a hydraulic transmission the combination of a closed hydraulic circuit having working and return sides, a variable displacement pump for feeding said circuit, a second pump, and valve mechanism adjustable to deliver liquid from said second named pump into said return side to maintain said circuit flooded or into said working side to increase the flow therein.

11. In a hydraulic transmission the combination of a closed hydraulic circuit having interchangeable working and return sides, a reversible flow variable displacement pump for feeding said circuit, a second pump, and valve mechanism adjustable to deliver liquid from said second pump into the return side to maintain said circuit flooded or into the working side to increase the flow therein.

12. In a hydraulic transmission the combination of a hydraulic circuit, a variable displacement pump for feeding said circuit, means for regulating pump displacement, a second pump, and valve mechanism adjustable to connect the discharge side of said second named pump with the discharge side of said first named pump to increase the flow in said circuit or to connect the discharge side of said second named pump with the intake side of said first named pump to supply liquid under pressure thereto.

13. In a hydraulic transmission the combination of a closed hydraulic circuit of varying volumetric capacity and having working and return sides, a pump in said circuit, a second pump, means adjustable to connect the discharge side of said second pump either with return side of said circuit to compensate for variations in the capacity thereof or with the working side of said circuit to increase the flow therein, and a relief valve cooperating with said second pump when the discharge thereof is connected with the return side of said circuit to maintain said return side flooded with liquid under pressure.

14. In a hydraulic transmission the combination of a reversible flow closed hydraulic circuit of varying volumetric capacity having interchangeable working and return sides, a reversible variable displacement pump in said circuit, a second pump, means adjustable to connect the discharge from said second pump either with the return side or with the working side of said circuit in either direction of flow therein, a low pressure relief valve cooperating with said second pump when the discharge thereof is connected with the return side of said circuit to maintain the return side of said circuit flooded with liquid under low pressure, and a high pressure relief valve operable to prevent excessive pressures in the working side of said circuit.

15. In a hydraulic transmission the combination of a hydraulic motor, a reversible flow hydraulic circuit for driving said motor having interchangeable working and return sides, a variable displacement pump for feeding said circuit, a second pump, valve mechanism adjustable to connect the discharge of said second pump either with a return side or a working side of said circuit in either direction of flow therein, a low pressure relief valve cooperating with said second pump when the discharge thereof is connected with a return side to maintain said return side flooded with liquid under pressure, means for regulating the displacement of said variable displacement pump, and a control element for controlling said valve mechanism and said displacement regulating means.

16. In a machine of the character described having a work holder, a tool carrier, and means for effecting relative movement between said holder and carrier to effect a cut, the combination of a hydraulic circuit including a variable displacement pump driven by said means for effecting a regulated feed movement between said holder and carrier during the cut, a second pump for effecting rapid movement between said holder and carrier for rapid traverse, and means for regulating the displacement of said first named pump and for controlling the flow of liquid discharged from said second named pump.

17. In a machine of the character described having a work holder, a tool carrier, and means for effecting relative rotation between said holder and carrier to effect a cut, the combination of a hydraulic circuit including a variable displacement pump for effecting a regulated feed movement between said holder and carrier during the cut, a second pump for effecting rapid movement between said holder and carrier for rapid traverse, a single control element, means controlled thereby for varying and controlling the displacement of said first named pump, and valve means controlled by said element for controlling the discharge from said second named pump.

18. In a hydraulic transmission, the combination of a hydraulic motor, a rapid traverse pump, a hydraulic circuit including valve mechanism operable to connect said pump with said motor to effect rapid traverse operation thereof in either direction, a variable displacement feed rate pump connected to said motor for effecting operation thereof at a predetermined feed rate, connections through which said feed rate pump is supplied with liquid from said circuit to maintain said feed rate pump flooded under all conditions of operation, means for regulating the displacement of said feed rate pump, and means for operating said valve mechanism.

19. The combination, with a machine tool having a movable member, of a hydraulic circuit including a hydraulic motor for moving said member at feeding and rapid traverse rates and a variable displacement feed rate pump for metering the flow in said circuit to thereby accurately regulate the rate of movement of said member during feeding, a liquid reservoir, a second pump supplied from said reservoir and cooperating with said circuit to keep said feed rate pump flooded, and valve means operable to direct the discharge of said second pump into the working side of said circuit to increase the rate of flow therein and thereby effect rapid traverse movement of said member.

20. In a hydraulic transmission the combination of a hydraulic circuit, a casing, a variable displacement pump in said casing, means connecting said pump with said circuit, means for varying pump displacement, a second pump in said casing, and adjustable means within said casing for selectively connecting said last named pump in series or in parallel with said variable displacement pump.

21. In a hydraulic transmission the combination of a hydraulic circuit, a casing, a variable displacement pump within said casing for feeding said circuit, a cam within said casing for varying pump displacement, a second pump, valve mechanism within said casing for controlling communication between said second named pump and said circuit, and means for controlling said cam and said valve mechanism.

22. In a hydraulic transmission the combination of a hydraulic circuit, a variable displacement pump for feeding said circuit, means for regulating pump displacement, and valve mechanism associated with said regulating means and operable in unison therewith for automatically effecting communication between the two sides of said circuit after pump displacement has been reduced to zero and for closing communication between the two sides of said circuit before pump displacement is increased from zero.

23. In a hydraulic transmission the combination of a hydraulic circuit, a variable displacement pump for feeding said circuit, means for regulating pump displacement, a second pump, valve mechanism controlling communication between said last named pump and said circuit, means for simultaneously operating said regulating means and said valve mechanism, said valve mechanism having means for automatically effecting communication between the opposite sides of said circuit when the displacement of said first named pump is zero.

24. In a hydraulic transmission the combination of a hydraulic circuit having working and return sides, and a pump for creating pressure therein, a second pump, valve mechanism adjustable to connect said second pump with either the working or return side of said circuit, a discharge passage connected with the return side of said circuit in all positions of said valve mechanism, and means for resisting the flow of liquid through said discharge passage to mantain pressure within said return side.

25. In a hydraulic transmission the combination of a hydraulic circuit, having a pump and a motor connected therein, a second pump, a discharge passage, valve mechanism adjustable to connect said second pump to either side of said circuit to drive said motor in either direction and to simultaneously connect said discharge passage with the other side of said circuit, and means for resisting the flow thru said discharge passage to maintain pressure within said other side.

26. In a hydraulic transmission the combination of a reversible flow closed hydraulic circuit of varying volumetric capacity having interchangeable working and return sides, a pump in said circuit for feeding the same, a second pump, a discharge passage, means adjustable to connect said second pump with either the working or return side of said circuit in either direction of flow and to connect said discharge passage with said return side only, and means for resisting the escape of liquid through said discharge passage to maintain said return side flooded with liquid under pressure in either direction of flow.

27. The combination, with a machine tool having a movable member, of a hydraulic motor for driving said member, hydraulic pump means including a variable displacement feed rate pump and a rapid traverse pump, liquid conducting channels between said pump means and motor including connections changeable to alternatively connect said pumps for feed or rapid traverse movements and to reverse the direction of movement of said member, and valve means operable to effect the above named changes in said channel connections, said channel connections serving to maintain said feed rate pump flooded regardless of the position of said valve means.

WALTER FERRIS.